US012633627B2

(12) United States Patent
Guo et al.

(10) Patent No.: US 12,633,627 B2
(45) Date of Patent: May 19, 2026

(54) BATTERY WITH AN ASYMMETRIC DESIGN AND ELECTRONIC DEVICES WITH AN ASYMMETRIC BATTERY DESIGN

(71) Applicant: Apple Inc., Cupertino, CA (US)

(72) Inventors: Liang Guo, San Jose, CA (US); Brian J. Haskins, Campbell, CA (US); Premanand Ramadass, San Mateo, CA (US); Ghazal Shoorideh, Santa Clara, CA (US); Jamie N. Forslin, Cupertino, CA (US); He Li, Shenzhen (CN); Abdifatah M. Mohamed, Cupertino, CA (US); Liubin Zhou, Shenzhen (CN)

(73) Assignee: Apple Inc., Cupertino, CA (US)

( * ) Notice: Subject to any disclaimer, the term of this patent is extended or adjusted under 35 U.S.C. 154(b) by 803 days.

(21) Appl. No.: 17/447,610

(22) Filed: Sep. 14, 2021

(65) Prior Publication Data

US 2023/0083571 A1     Mar. 16, 2023

(51) Int. Cl.
| | |
|---|---|
| *H01M 50/543* | (2021.01) |
| *H01M 10/04* | (2006.01) |
| *H01M 10/0585* | (2010.01) |

(52) U.S. Cl.
CPC ..... *H01M 50/543* (2021.01); *H01M 10/0436* (2013.01); *H01M 10/0585* (2013.01)

(58) Field of Classification Search
None
See application file for complete search history.

(56) References Cited

U.S. PATENT DOCUMENTS

| | | | |
|---|---|---|---|
| 8,216,716 B2* | 7/2012 | Kim | |
| 9,252,452 B2* | 2/2016 | Kwon ............... | H01M 10/0413 |
| 9,478,773 B2 | 10/2016 | Kang et al. | |
| 9,997,809 B2* | 6/2018 | Lee ..................... | H01M 10/425 |
| 2013/0101883 A1* | 4/2013 | Zhao ................... | H01M 50/543 |
| | | | 429/121 |
| 2021/0020893 A1* | 1/2021 | Jeon .................. | H01M 10/0587 |

FOREIGN PATENT DOCUMENTS

| | | |
|---|---|---|
| CN | 213636154 U | 7/2021 |
| KR | 20070099068 A | 10/2007 |
| WO | 2016056776 A1 | 4/2016 |

* cited by examiner

*Primary Examiner* — Nicole M. Buie-Hatcher
*Assistant Examiner* — Krishna R Hammond
(74) *Attorney, Agent, or Firm* — BAKERHOSTETLER

(57) ABSTRACT

This application relates to batteries with an asymmetric design. At least some batteries described herein include two sections having different shapes and/or sizes, thus having different volumes. Having a battery formed with a relatively larger sections allows for several advantages. For example, the larger section can accommodate bending of a tab used to connect several electrodes together. Additionally, with the larger section providing space for the bent tab, the electrodes can be extended in, for example, the relatively smaller section. As a result, the battery can provide additional energy storage.

15 Claims, 8 Drawing Sheets

400

PROVIDE SEVERAL ELECTRODES
WITHIN AN ASYMMETRIC HOUSING          402

CONNECT A TAB TO THE
ELECTRODES          404

BEND THE TAB AND THE PLURALITY
OF ELECTRODES WITHIN THE
ASYMMETRIC HOUSING          406

BATTERY WITH AN ASYMMETRIC DESIGN AND ELECTRONIC DEVICES WITH AN ASYMMETRIC BATTERY DESIGN

FIELD

The described embodiments relate generally to battery architecture. More particularly, the present embodiments relate to batteries with an asymmetric design that allows batteries to include several enhancements, such as increased energy storage capacity and reduced impedance.

BACKGROUND

As an alternative to stationary sources (e.g., a wall outlet), batteries provide energy storage to devices, such as consumer electronic devices. Recent advances in battery technology promote increased battery life over prior versions. However, certain battery designs may have drawbacks. For example, to modify a tab that connects together several electrodes, additional space is required within the battery. As a result, the electrodes must shrink in size to accommodate the tab modifications. The reduced electrode size can lead to lower energy storage/capacity, which is generally desirable given increased energy consumption by advanced hardware with an electronic device.

SUMMARY

This paper describes various embodiments that relate to batteries with an asymmetric design configuration.

Other aspects and advantages of the invention will become apparent from the following detailed description taken in conjunction with the accompanying drawings which illustrate, by way of example, the principles of the described embodiments.

According to some aspects of the present disclosure, an electronic device is described. The electronic device may include a housing. The electronic device may further include a battery assembly located in the housing. The battery assembly may include an asymmetric housing that defines an internal volume. The asymmetric housing may include a first section defined by a first volume. The asymmetric housing may further include second section defined by a second volume different from the first volume. The battery assembly may further include a plurality of electrodes disposed in the asymmetric housing. The battery assembly may further include a tab electrically coupled with the plurality of electrodes. In some embodiments, the tab forms a bend within the asymmetric housing.

According to some aspects of the present disclosure, a battery assembly is described. The battery assembly may include an asymmetric housing that defines an internal volume. The asymmetric housing may include a first section. The asymmetric housing may further include a second section different from the first section. In some embodiments the second section extends from the first section to define a ledge. The battery assembly may further include a plurality of electrodes disposed in the asymmetric housing. The battery assembly may further include a tab electrically coupled with the plurality of electrodes. In some embodiments, the tab forms a bend within the asymmetric housing and extends from the asymmetric housing to at least partially cover the ledge.

According to some aspects of the present disclosure, a method for forming a battery assembly is described. The method may include providing a plurality of electrodes within an asymmetric housing. The method may further include connecting a tab to the plurality of electrodes. The method may further include bending the tab and the plurality of electrodes within the asymmetric housing.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figures 1, 2:
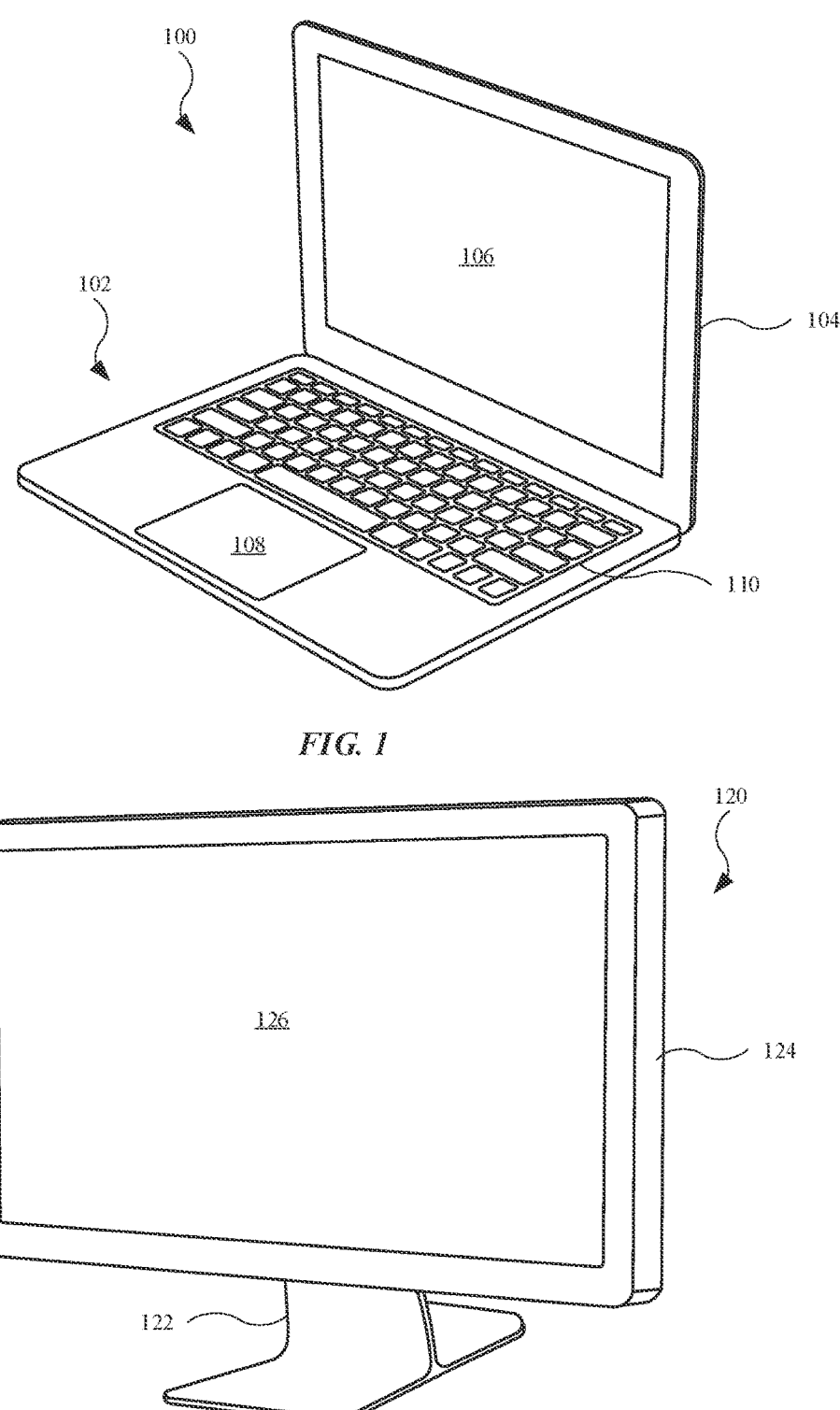
FIGS. 1-4 illustrate various electronic devices, in accordance with some described embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

This application is directed to batteries, or battery packs, that include an asymmetric geometry. The asymmetric geometry, or design, of batteries described herein offers several advantages. For example, the battery may include an extended or enlarged volume used to nest, or house, a tab that connects together several electrodes. In this manner, the tab can be bent (e.g., V-shaped bend) or otherwise modified to fit within the battery housing. This not only allows structural features of the battery to be housed within the battery housing, but also decreases the impedance provided by the tab. Without the extended section provided by the asymmetric battery design, traditional batteries have to sacrifice electrode size to accommodate any tab modifications.

Additionally, by using added volume from the asymmetric design, the electrodes (used to store electrical energy) can increase in size by increasing at least one dimension. For example, although the tab is modified within the battery, the tab remains within one section (i.e., the relatively larger section) of the battery. As a result, the remaining section is unencumbered by the modified tab, thereby providing space into which the electrodes can extend. Thus, by having larger electrodes, the battery can increase the energy storage, or energy capacity. Alternatively, in some embodiments, the electrodes can remain the same size, and the overall size/volume of the battery can be reduced. In this manner, the energy density (energy per volume) increases.

As shown and described herein, a battery assembly may include one or more batteries used to provide energy to consumer electronic devices (e.g., laptops, displays, desktop computing devices with displays, mobile wireless communication devices such as smartphones and tablet computing devices, smart watches, and accessories such as wireless headphones). By modifying one or more batteries of the battery assembly, the modified battery/batteries can be reduced in size while not sacrificing energy storage. Advantageously, the battery pack can accommodate consumer electronic devices, particularly those with a smaller footprint as can be the case with newer consumer electronic devices.

These and other embodiments are discussed below with reference to FIGS. 1-12. However, those skilled in the art will readily appreciate that the detailed description given herein with respect to these figures is for explanatory purposes only and should not be construed as limiting.

FIGS. 1-4 illustrate various electronic devices, in accordance with some described embodiments. Each of the electronic devices shown and described in FIGS. 1-4, as well as other electronic devices described herein, may include a battery assembly that includes one or more batteries.

FIG. 1 illustrates an isometric view of an embodiment of a laptop computing device 100. Laptop computing device 100 includes a base portion 102 and a display housing 104 rotatable with respect to base portion 102. Display housing 104 carries a display 106 designed to present visual information (e.g., textual images, video/motion images, and/or still images). Base portion 102 includes a track pad 108 (or touch pad) and a keyboard 110. Track pad 108 and keyboard 110 are used to provide inputs to processing circuitry (not shown in FIG. 1), which can subsequently provide a command(s) to alter the visual information on display 106.

FIG. 2 illustrates an isometric view of an embodiment of a desktop computing device 120. Desktop computing device 120 may take the form of a standalone computing device or a display device in communication with another computing device (e.g., laptop computing device or other desktop computing device). Desktop computing device 120 includes a stand 122 and a display housing 124 rotatable with respect to stand 122. Display housing 124 carries a display 126 designed to present visual information (e.g., textual images, video/motion images, and/or still images). Although not shown, desktop computing device 120 may include processing circuitry in communication with accessory devices (e.g., keyboard, track pad) via a wired or wireless communication, with the accessory devices used to provide a command(s) to alter the visual information on display 126.

Figure 3:
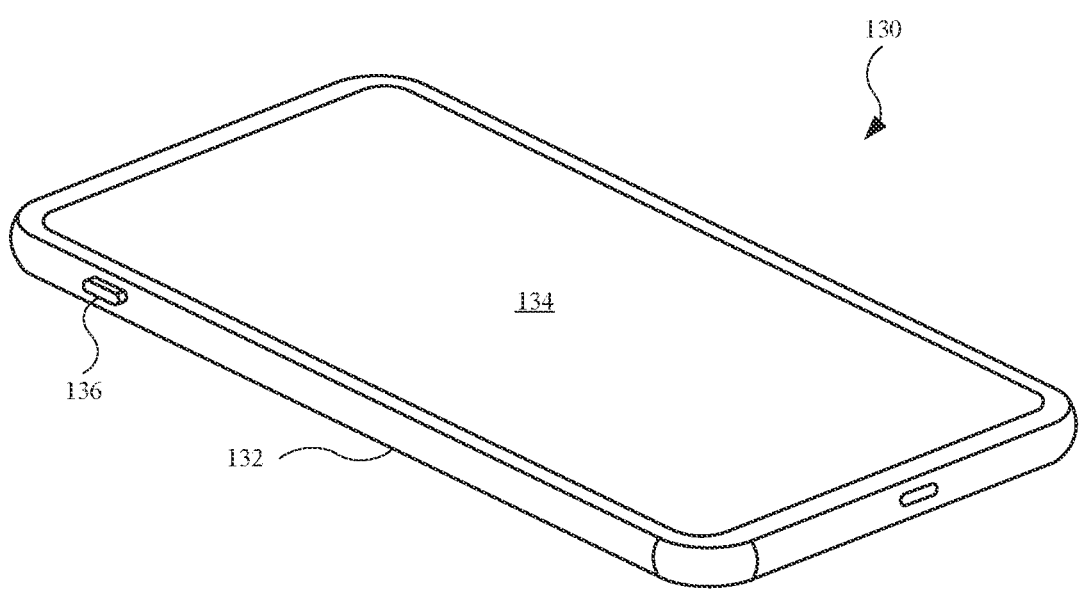

FIG. 3 illustrates an isometric view of a mobile wireless communication device 130. Mobile wireless communication device 130 may take the form of a smartphone or a tablet computing device. Mobile wireless communication device 130 includes a housing 132 and a display 134 coupled to housing 132. In order to provide controls to alter visual information on display 134, mobile wireless communication device 130 includes a button 136 (representative of one or more buttons) used as an input to processing circuitry (not shown in FIG. 3) of mobile wireless communication device 130.

Figure 4:
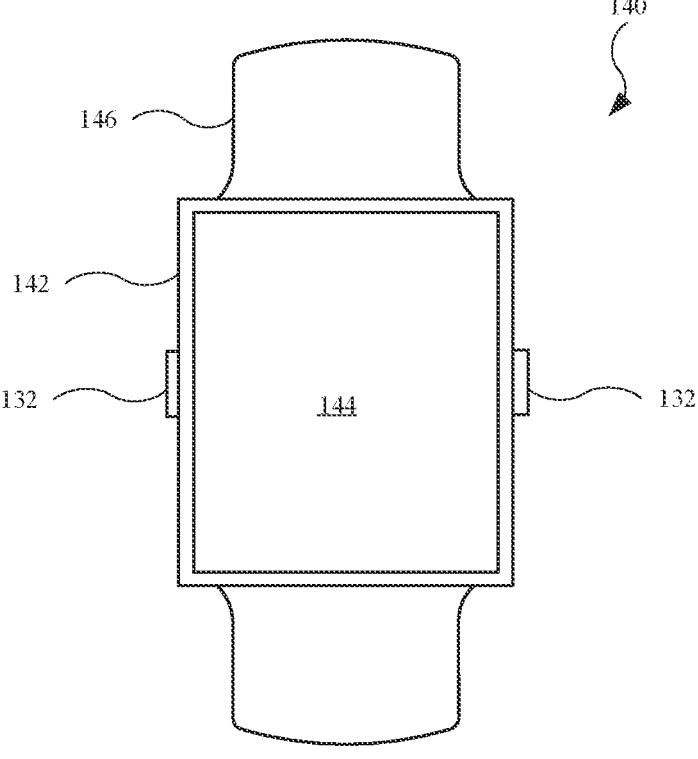

FIG. 4 illustrates a plan view of a wearable device 140. Wearable device 140 may take the form of a smart watch. Wearable device 140 includes a housing 142 and a display 144 coupled to housing 142. In order to provide controls to alter visual information on display 144, wearable device 140 includes button 146a and 146b used as an input to processing circuitry (not shown in FIG. 3) of wearable device 140. Additionally, in order to secure wearable device 140 to an appendage (e.g., wrist) of a user, wearable device 140 includes a band 146 coupled to housing 142.

Figure 5:
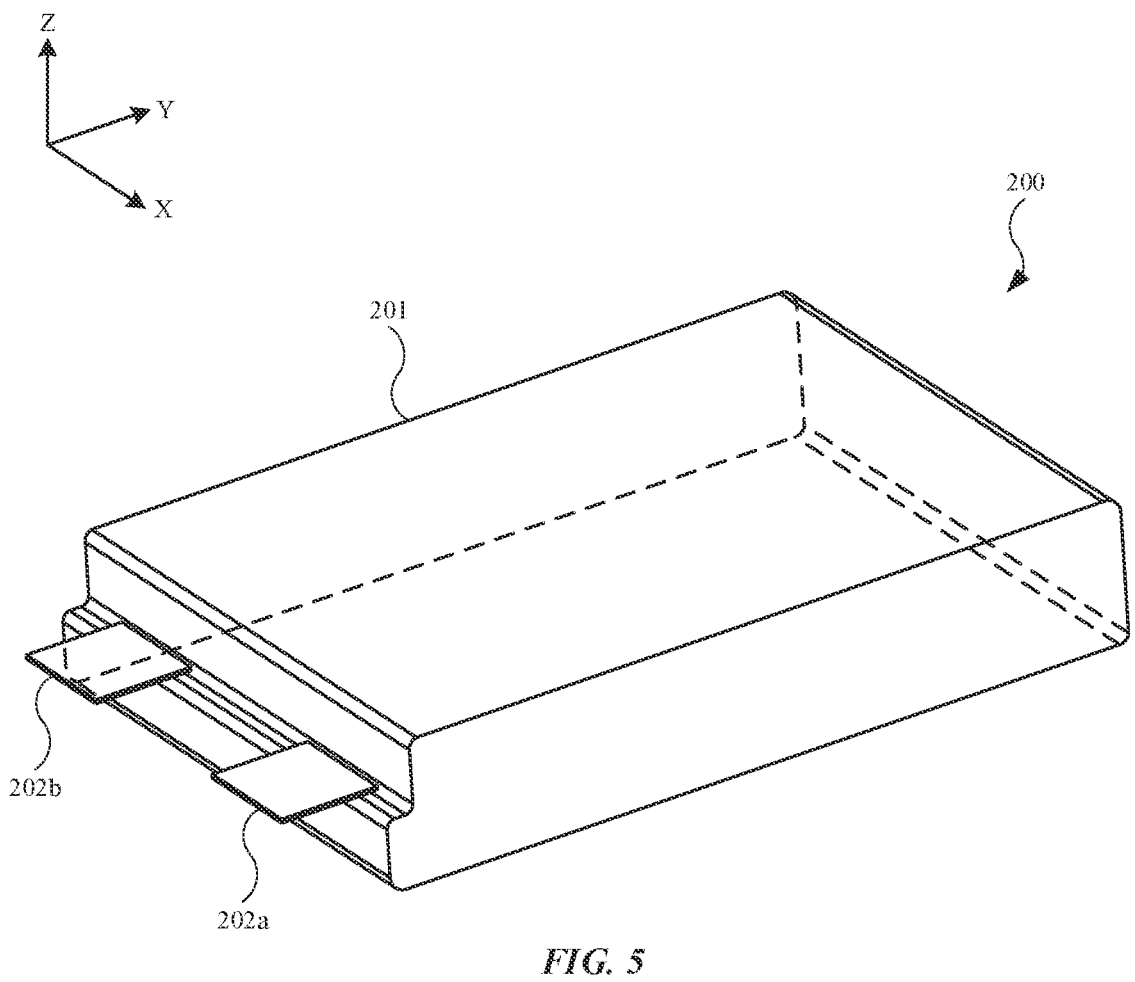
FIG. 5 illustrates an isometric view of an embodiment of a battery.

FIG. 5 illustrates an isometric view of an embodiment of a battery 200. Battery 200 may be used to provide electrical energy to electronic devices described herein. Battery 200 may be referred to as a battery pack. Also, battery 200 may include one or more battery cells (not shown in FIG. 5) used to generate and store energy. Additionally, battery 200 may define a battery assembly or one of several batteries of a battery assembly. In some embodiments, battery 200 is a lithium ion (Li-ion) battery. As shown, battery 200 includes a housing 201. In some embodiments, housing 201 includes an asymmetric housing. This will be further shown and described below. Battery 200 further includes tabs 202a and 202b, each of which are partially disposed within housing 201 and also partially extending from (externally with respect to) housing 201. Tabs 202a and 202b are designed to couple with connections (not shown in FIG. 5) within an electronic device (including a bus bar), and discharge electrical energy to charge various components within the electronic device. Further, at least one of tabs 202a and 202b can receive electrical energy to recharge battery 200. Tabs 202a and 202b may represent a positive terminal and a negative terminal, respectively. In this regard, tab 202a may be connected to several cathodes while tab 202b may be connected to several anodes, with the cathodes and anodes disposed within housing 201.

Figure 6:
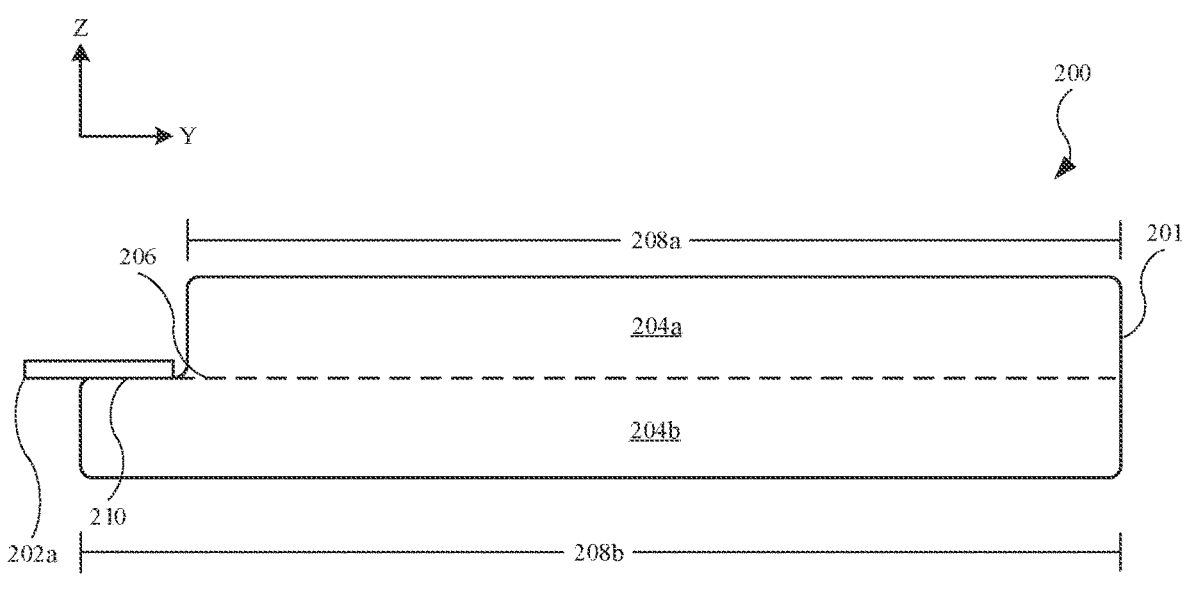
FIG. 6 illustrates a side view of the battery shown in FIG. 5.

FIG. 6 illustrates a side view of battery 200 shown in FIG. 5. Several dimensional details of battery 200 are shown. For example, battery 200 may include sections 204a and 204b (also referred to as a first section and a second section, respectively). Sections 204a and 204b can be separated by an imaginary line 206 extending along the Y-axis (in Cartesian coordinates). As shown, section 204a includes a dimension 208a and section 204b includes a dimension 208b, with dimensions 208a and 208b being measured along the Y-axis. It can be seen that dimension 208a is less than dimension 208b, and accordingly, section 204a is less, or shorter, than section 204b.

Referring again to FIG. 5, it can be seen that the dimensions of battery 200 are generally uniform along the X- and Z-axes. Accordingly, based on the disparity in dimensions 208a and 208b, the volume of section 204a is less than the volume of section 204b. In this regard, based on sections 204a and 204b, housing 201 can be referred to as an asymmetric housing, as sections 204a and 204b forming a stacked configuration with section 204b extending further along the Y-axis as compared to section 204a. Further, due to section 204a being shorter than section 204b due to dimensions 208a and 208b, respectively, section 204b extends further laterally than section 204a. As a result, section 204b defines a ledge 210a, which provides a receiving surface for tab 202a and tab 202b (not shown in FIG. 6). Additionally, based on the disparate sizes of sections 204a and 204b, battery 200 forms a stepped configuration, with one of the surfaces of the stepped configuration including ledge 210.

Figure 7:
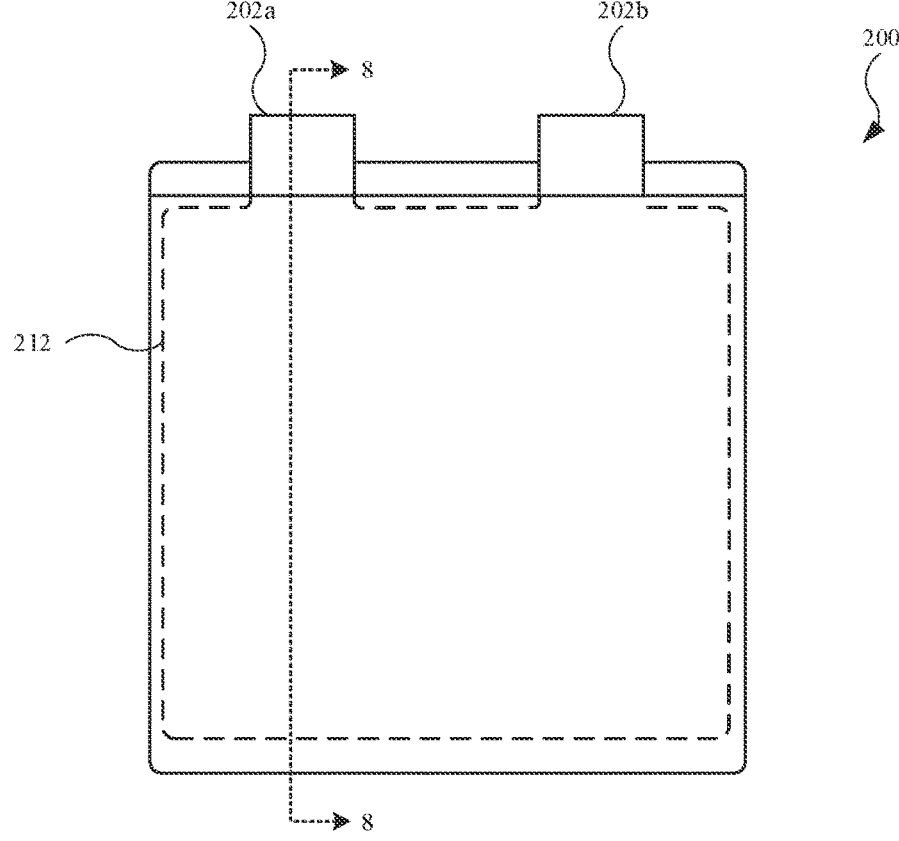
FIG. 7 illustrates a plan view of the battery shown in FIG. 5.

FIG. 7 illustrates a plan view of battery 200 shown in FIG. 5. As shown, battery 200 includes a cell 212 (shown as a dotted line). Cell 212 includes several electrodes (e.g., cathodes and anodes). Additionally, cell 212 includes electrolyte material that separates the electrodes. Also, cell 212 can be electrically coupled to tabs 202a and 202b.

Figure 8:
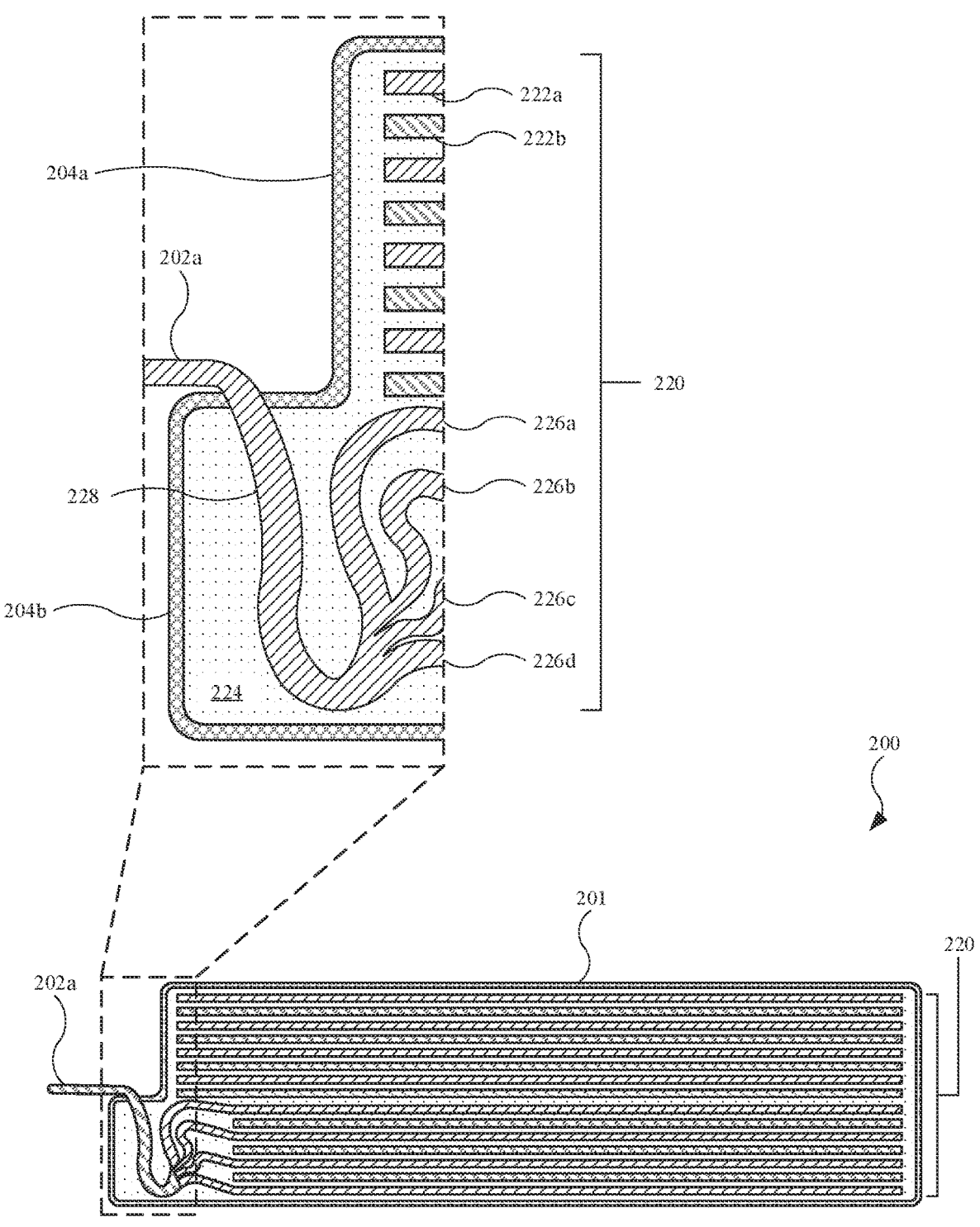
FIG. 8 illustrates a cross sectional view of the battery, taken along line 8-8 in FIG. 7.

FIG. 8 illustrates a cross sectional view of battery 200, taken along line 8-8 in FIG. 7. As shown, battery 200 includes electrodes 220 within housing 201. For example, as shown in the enlarged view, electrodes 220 include an electrode 222a and an electrode 222b, each of which being representative of additional electrodes. In some embodiments, electrodes 222a includes a cathode and electrode 222b includes an anode. In this regard, the cathodes and anodes are aligned in alternating manner (e.g., cathode-anode-cathode-anode or anode-cathode-anode-cathode) within housing 201. Additionally, between electrodes 220, battery 200 includes an electrolyte 224 within housing 201. Electrolyte 224 is used to store charged particles and convert chemical energy into electrical energy for battery 200. Although not shown, one or more separators can be used, in additional to electrolyte 224, to separate the electrodes 220. Also, it should be noted that the number of electrodes 220 is only representative, and several additional electrodes may be present in battery 200.

Additionally, the like electrode pairs (e.g., cathodes or electrodes) can combine at one location to form a tab. For example, as shown several electrodes 226a, 226b, 226c, and 226d (of the electrodes 220) combine to form tab 202a. These electrodes may include cathodes. Also, tab 202a combines with electrodes 226a, 226b, 226c, and 226d to form a bend 228 within battery 200. By bending electrodes 226a, 226b, 226c, and 226d to form bend 228, the electrical impedance provided by electrodes 226a, 226b, 226c, and 226d can be reduced, which can result in increased and more efficient current flow from battery 200.

Also, bend 228 is located within section 204b of battery 200, thereby allowing electrodes in section 204a (e.g., electrodes 222a and 222b) to extend near the walls of battery 200 defined by section 204a. In other words, section 204b, having a greater volume than that of section 204a, provides sufficient space to hold bend 228 (i.e., a combination of tab 202a and electrodes 226a, 226b, 226c, and 226d) such that bend 228 does not extend into section 204a. In this manner, the length (as well a size) of the electrodes in section 204a can be maximized, as no internal structures occupy space in section 204a. This can result in increased energy capacity by battery 200. Moreover, the length (as well a size) of the electrodes in section 204b, having the additional space as compared to section 204a, can be maximized, as bend 228 is generally confined to the "extended" region of section (i.e., the additional space that section 204b has over section 204a). This can result in even more energy capacity for battery 200. Alternatively, in some embodiments, battery 200 can include electrodes 220 with the length (and size) as other batteries, but reduce the overall footprint/size of battery 200. In this regard, battery 200 may include a reduced size but offer the same energy capacity, thus provide a battery with a higher energy density (i.e., energy per volume). It should also be noted that tab 202b (shown in FIG. 7) may include a similar configuration, with different electrodes, as shown for tab 202a.

Figure 9:
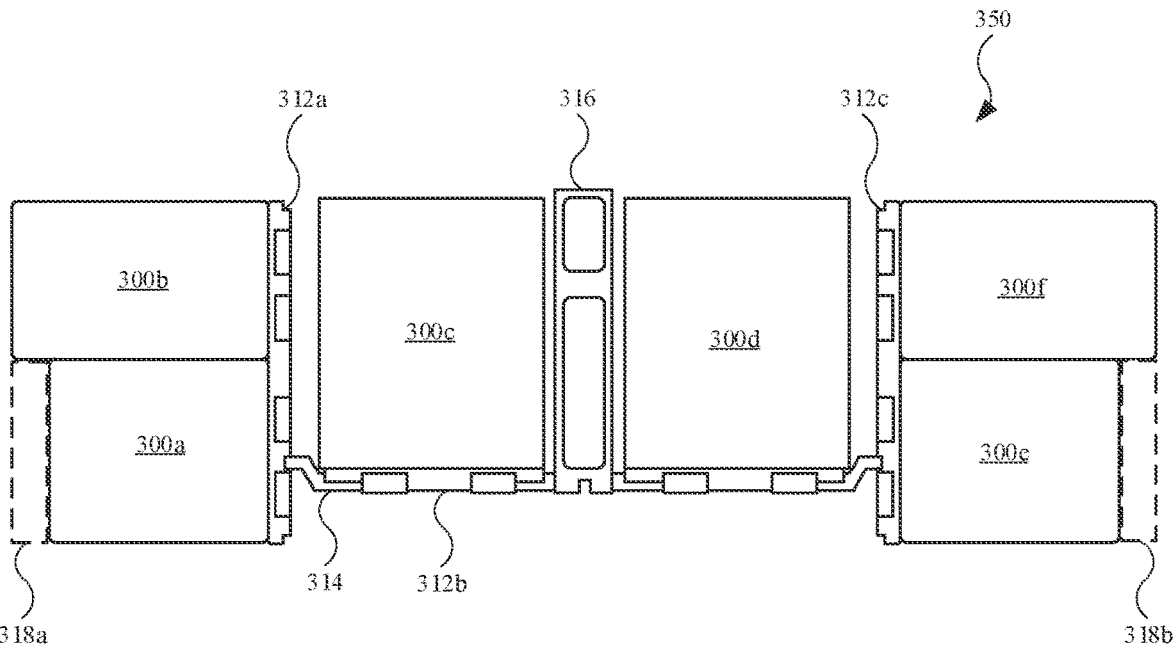
FIG. 9 illustrates an embodiment of a battery assembly.

FIG. 9 illustrates an embodiment of a battery assembly 350. In some embodiments, battery assembly 350 may refer to a single battery, or battery pack. In the embodiment shown in FIG. 9, battery assembly 350 includes multiple batteries. For example, as shown battery assembly 350 includes batteries 300a, 300b, 300c, 300d, 300e, and 300f. While a discrete number of batteries are shown in FIG. 9, battery assembly 350 may include a different number of batteries in other embodiments. Also, battery assembly 350 may include a bus bar 312a that electrically connects batteries 300a and 300b. Battery assembly 350 may include a bus bar 312b that electrically connects batteries 300c and 300d. Battery assembly 350 may include a bus bar 312c that electrically connects batteries 300e and 300f. Also, battery assembly 350 further includes a circuit 314 that electrically couples bus bars 312a, 312b, and 312c together, as well as to a circuit board 316 that carries processing circuitry (shown, not labeled) to control certain functions of battery assembly 350.

Using at least some of the advantageous features described herein for batteries, battery assembly 350 may include a reduced footprint, or reduced form factor. For example, batteries 300a and 300e can each be reduced in area. As shown, a rectangle 318a represents a reduced area of battery 300a by, for example, an asymmetric housing used to accommodate electrodes and tabs in a bent configuration (see for example, FIGS. 5-8). Similarly, a rectangle 318b represents a reduced area of battery 300e by, for example, an asymmetric housing used to accommodate electrodes and tabs in a bent configuration. Further, batteries 300a and 300e may provide the same energy capacity as a battery with an increased area (e.g., by adding the area of rectangles 318a and 318b, respectively) and increased volume. As a result, battery assembly 350 may occupy less space in an electronic device (not shown in FIG. 9), thereby allowing the electronic device more space for other hardware components.

Figure 10:
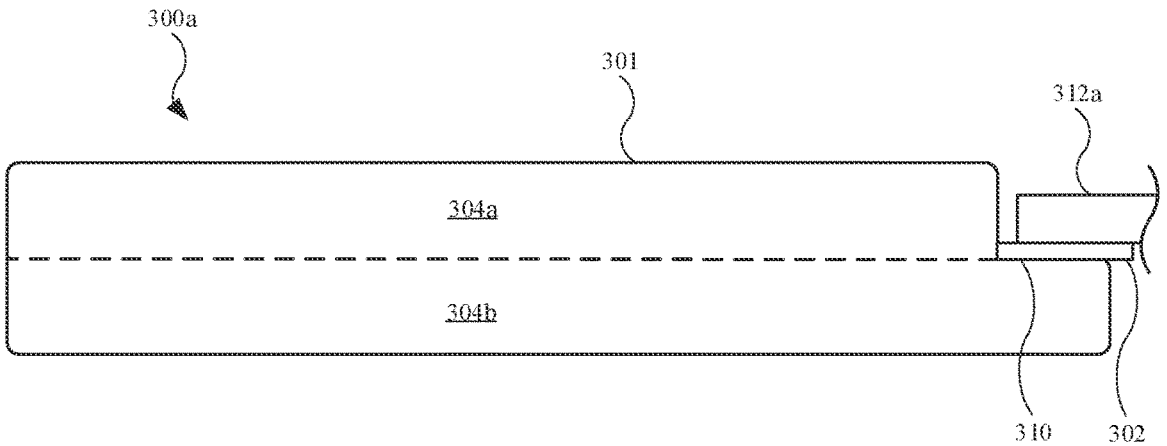
FIG. 10 illustrates a partial side view of the battery assembly shown in FIG. 9, showing the battery supporting a bus bar, in accordance with some described embodiments.

FIG. 10 illustrates a partial side view of battery assembly 350 shown in FIG. 9, showing battery 300a supporting bus bar 312a, in accordance with some described embodiments. As shown, battery 300a includes a housing 301 with a section 304a and a section 304b, with section 304a being smaller than section 304b (or conversely, section 304b being larger than section 304a). Accordingly, housing 301 may be referred to as an asymmetric housing. Sections 304a and 304b formed a stepped configuration similar to a prior embodiment, thereby creating a ledge 310 for a tab 302 and bus bar 312a (electrically coupled to tab 302). As a result, battery 300a (and other similar batteries described here) provide a support for one or more features, based on the shape of housing 301.

Figure 11:
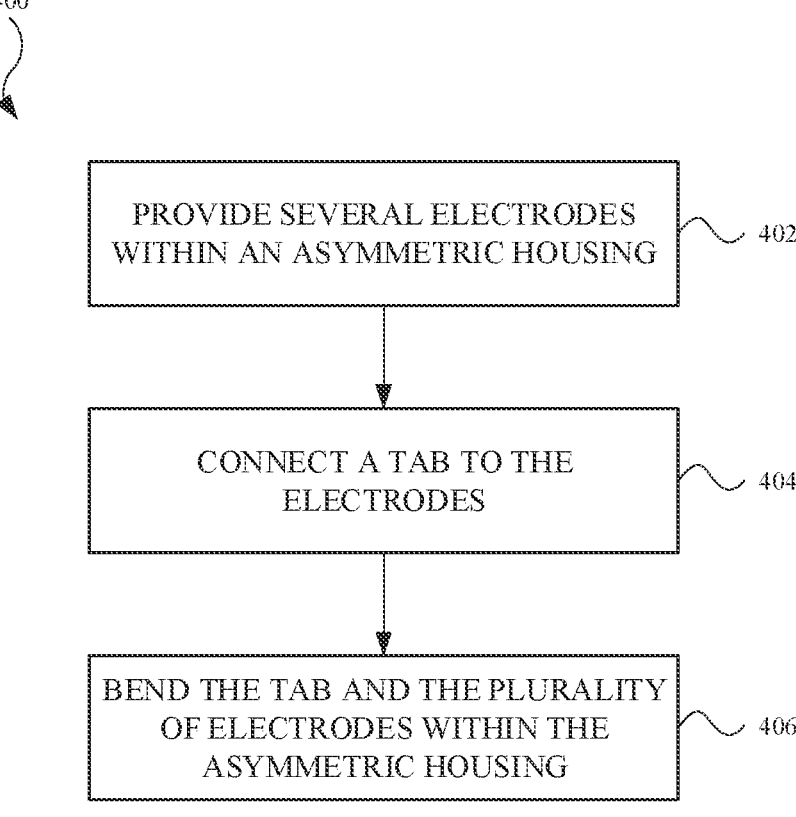
FIG. 11 illustrates a flowchart showing a method for forming a battery assembly, in accordance with some described embodiments.

FIG. 11 illustrates a flowchart 400 showing a method for forming a battery assembly, in accordance with some described embodiments. The method described in flowchart 400 can be used to form a battery, or alternatively, at least one or more batteries of a battery assembly. In either event, the battery/batteries formed using flowchart 400 can be integrated to any of the electronic devices described herein.

In step 402, several electrodes are provided within an asymmetric housing. The asymmetric housing may include multiple sections, with one section being smaller than another section. As a result, the asymmetric housing can form a ledge. The electrodes may include cathodes and anodes. Further, the cathodes may be disposed in an alternating fashion.

In step 404, a tab is connected to the electrodes. The tab can subsequently couple with a bus bar used to electrically connect multiple batteries together. It should be noted that two tabs can be connected to a respective set of electrodes.

In step 406, the tab and the electrodes are bent within the asymmetric housing. The resultant bent configuration may be disposed on an elongated region of the asymmetric housing, such as the longer of two sections. As a result, electrodes can be greater in length to decrease energy storage, or the battery's asymmetric housing can be reduced in size without decreasing energy storage.

Figure 12:
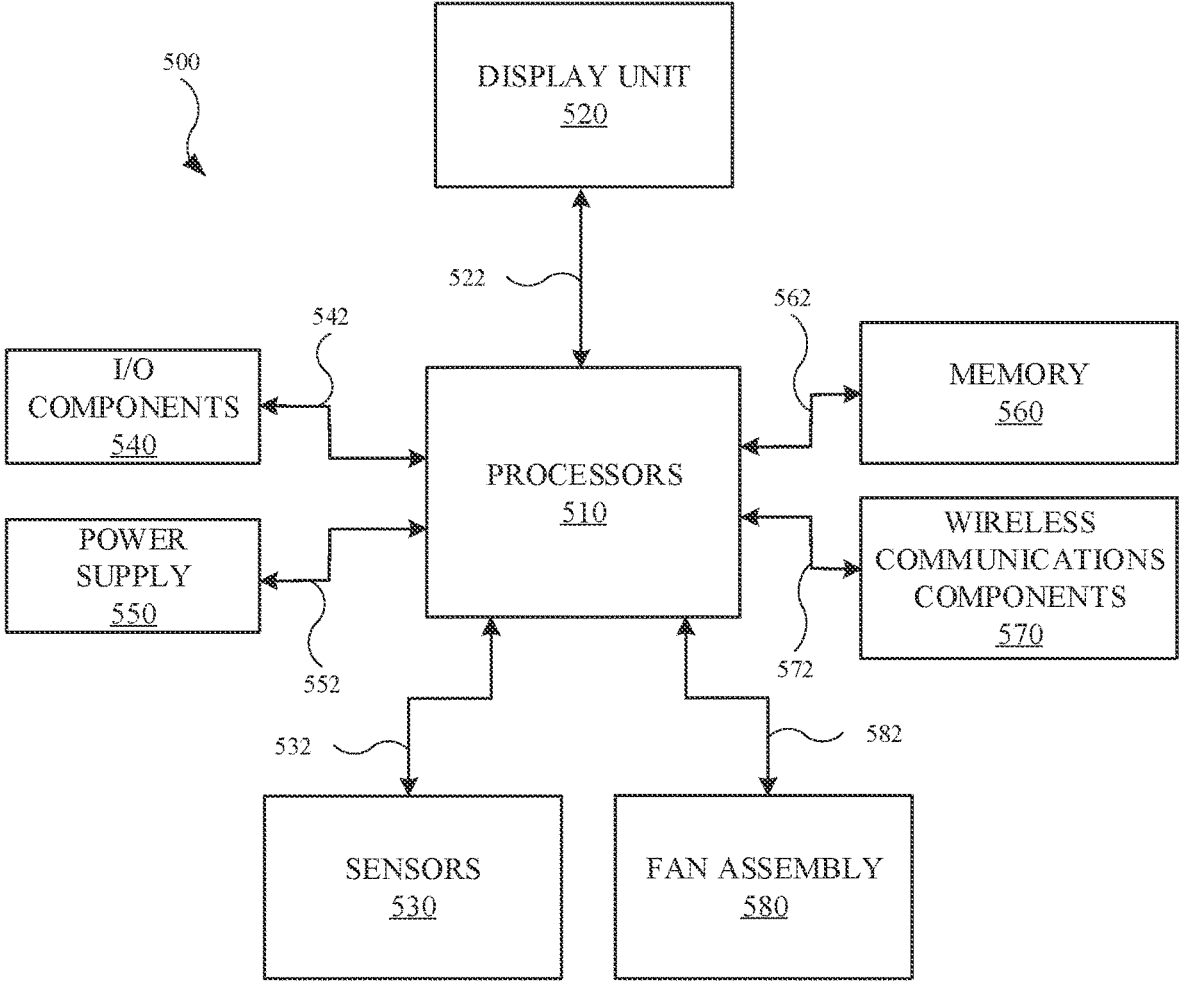
FIG. 12 illustrates a block diagram of an electronic device, in accordance with some described embodiments.

FIG. 12 illustrates a block diagram of an electronic device 500, in accordance with some described embodiments. The features in the electronic device 500 may be present in other electronic devices described herein. Electronic device 500 may include one or more processors 510 for executing functions of the electronic device 500. One or more processors 510 can refer to at least one of a central processing unit (CPU) and at least one microcontroller for performing dedicated functions. Also, one or more processors 510 can refer to application specific integrated circuits.

According to some embodiments, electronic device 500 can include a display unit 520. Display unit 520 is capable of presenting a user interface that includes icons (representing software applications), textual images, and/or motion images. In some examples, each icon can be associated with a respective function that can be executed by one or more processors 510, In some cases, display unit 520 includes a display layer (not illustrated), which can include a liquid-crystal display (LCD), light-emitting diode display (LED), or the like. According to some embodiments, display unit 520 includes a touch input detection component and/or a force detection component that can be configured to detect changes in an electrical parameter (e.g., electrical capacitance value) when the user's appendage (acting as a capacitor) comes into proximity with display unit 520 (or in contact with a transparent layer that covers the display unit 520). Display unit 520 is connected to the one or more processors 510 via one or more connection cables 522.

According to some embodiments, electronic device 500 can include one or more sensors 530 capable of providing an input to one or more processors 510 of the electronic device 500. One or more sensors 530 may include a temperature sensor(s), as a non-limiting example. One or more sensors 530 is/are connected to one or more processors 510 via one or more connection cables 532.

According to some embodiments, electronic device 500 can include one or more input/output components 540. In some cases, one or more input/output components 540 can refer to a button or a switch that is capable of actuation by the user. When one or more input/output components 540 are used, one or more input/output components 540 can generate an electrical signal that is provided to one or more processors 510 via one or more connection cables 542.

According to some embodiments, electronic device 500 can include a power supply 550 that is capable of providing energy to the operational components of electronic device 500. In some examples, power supply 550 can refer to a rechargeable battery. Power supply 550 can be connected to one or more processors 510 via one or more connection cables 552. Power supply 550 can be directly connected to other devices of electronic device 500, such as one or more input/output components 540. In some examples, electronic device 500 can receive power from another power sources (e.g., an external charging device) not shown in FIG. 12. Further, power supply 550 may include a housing that takes the form of an asymmetric housing in a manner described herein.

According to some embodiments, electronic device 500 can include memory 560, which can include a single disk or multiple disks (e.g., hard drives), and includes a storage management module that manages one or more partitions within memory 560. In some cases, memory 560 can include flash memory, semiconductor (solid state) memory or the like. Memory 560 can also include a Random Access Memory ("RAM") and a Read-Only Memory ("ROM"). The ROM can store programs, utilities or processes to be executed in a non-volatile manner. The RAM can provide volatile data storage, and stores instructions related to the operation of electronic device 500. In some embodiments, memory 560 refers to a non-transitory computer readable medium. One or more processors 510 can also be used to execute software applications. In some embodiments, a data bus 562 can facilitate data transfer between memory 560 and one or more processors 510.

According to some embodiments, electronic device 500 can include wireless communications components 570. A network/bus interface 572 can couple wireless communications components 570 to one or more processors 510. Wireless communications components 570 can communicate with other electronic devices via any number of wireless communication protocols, including at least one of a global network (e.g., the Internet), a wide area network, a local area network, a wireless personal area network (WPAN), or the like. In some examples, wireless communications components 570 can communicate using NFC protocol, BLUETOOTH® protocol, or WIFI® protocol.

According to some embodiments, electronic device 500 can include a fan assembly 580. Fan assembly 580 is designed to drive air flow and/or remove heat from one or more heat-generating components of electronic device 500, such as one or more processors 510. In some embodiments, one or more cables 582 can facilitate signals between fan assembly 580 and the one or more processors 510. As a result, one or more processors 510 may use information from one or more sensors 530 to control fan assembly 580.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An electronic device, comprising:
a housing;
a battery assembly located in the housing, the battery assembly comprising:
an asymmetric housing that defines an internal volume, the asymmetric housing comprising:
a first section defined by a first volume, and
a second section defined by a second volume greater than the first volume, the second section comprising a ledge based on asymmetry between the first section and the second section;
a plurality of electrodes disposed in the asymmetric housing; and
a tab electrically coupled with the plurality of electrodes, wherein the tab is positioned over the ledge and forms a bend within the asymmetric housing.

2. The electronic device of claim 1, wherein the second volume is greater than the first volume.

3. The electronic device of claim 2, wherein the bend is disposed in the second section.

4. The electronic device of claim 2, wherein the first section is stacked on the second section.

5. The electronic device of claim 1, wherein
the tab extends from the asymmetric housing and at least partially covers the ledge.

6. The electronic device of claim 5, wherein the tab is electrically coupled to the plurality of electrodes.

7. The electronic device of claim 1, further comprising a plurality of anodes, wherein the plurality of electrodes comprises a plurality of cathodes.

8. The battery assembly of claim 1, further comprising:
a second battery; and
a bus bar electrically coupled to the tab and the second battery.

9. A battery assembly, comprising:
an asymmetric housing that defines an internal volume, the asymmetric housing comprising:
a first section comprising a first volume, and
a second section comprising a second volume greater than the first volume, wherein the second section extends from the first section to define a ledge;
a plurality of electrodes disposed in the asymmetric housing; and
a tab electrically coupled with the plurality of electrodes, wherein the tab forms a bend within the second section and extends from the second section to at least partially cover the ledge.

10. The battery assembly of claim 9, wherein:
the first section is stacked on the second section, and
the first section combines with the second section to form a stacked configuration.

11. The battery assembly of claim 9, further comprising:
a second battery; and
a bus bar electrically coupled to the tab and the second battery.

12. The battery assembly of claim 9, wherein the plurality of electrodes comprises a plurality of cathodes.

13. The battery assembly of claim 9, wherein the first section is stacked on the second section.

14. The battery assembly of claim 13, wherein the bend is disposed in the second section.

15. The battery assembly of claim 13, further comprising a second tab electrically coupled with the plurality of electrodes.

* * * * *